Sept. 22, 1959  H. A. GOODIN, JR., ET AL  2,905,486
COUPLING DEVICE
Filed Nov. 16, 1953  3 Sheets-Sheet 1

INVENTOR.
HARRY A GOODIN JR.
CARSON E HAWK
BY
Gordon Angus
ATTORNEY

Sept. 22, 1959  H. A. GOODIN, JR., ET AL  2,905,486
COUPLING DEVICE

Filed Nov. 16, 1953  3 Sheets-Sheet 2

INVENTOR.
HARRY A GOODIN JR.
CARSON E HAWK
BY
ATTORNEY

Sept. 22, 1959 H. A. GOODIN, JR., ET AL 2,905,486
COUPLING DEVICE
Filed Nov. 16, 1953 3 Sheets-Sheet 3

INVENTOR.
HARRY A GOODIN JR.
CARSON E HAWK
BY
Gordon Argus
ATTORNEY

United States Patent Office 2,905,486
Patented Sept. 22, 1959

2,905,486

COUPLING DEVICE

Harry A. Goodin, Jr., Monrovia, and Carson E. Hawk, San Dimas, Calif., assignors to Aerojet-General Corporation, Azusa, Calif., a corporation of Ohio Application November 16, 1953, Serial No. 392,078

5 Claims. (Cl. 284—19)

This invention relates to hose couplings, and in particular to a quick-disconnect coupling having two separable mating halves each of which is self sealing when the coupling is disconnected.

In the handling of hazardous materials such as fuming acids and the like, it is important that personnel and equipment be exposed to fumes and liquids only to an irreducible minimum extent. Additionally, in some types of systems, it is desirable to exclude air and extraneous matter from the system which might be introduced during the filling operation. Many couplings have been designed in an effort to accomplish these ends, but most have such inherent disadvantages as an undesirable complexity of operation, or the leaving of an open filler neck later to be capped, or even a drainage of residual fluid from a nozzle onto places where damage may result.

An object of this invention is to provide a coupling which is particularly well-suited to the handling of hazardous materials. It can be quickly and easily connected and disconnected, and means are provided for closing off the lines until the coupling is mated. Coupling is accomplished without forming any regions where residual fluids can gather so as to remain outside the lines when the coupling is disconnected. These aspects make for a safe coupling which seals and will not spill in the event of an accidental disconnect, even with line pressure still on.

A feature of the coupling of this invention resides in a pair of mating halves, the contact end of each of which is plugged when the halves are separated. Use of the term "halves" is not intended to infer that the members have exactly similar structure, because they do not. The term is used to denote the fact that the two "halves" unite to form the complete coupling. Each of the plugs in the halves is associated by springing means with a slidable element so that the plugs abut when the halves are pressed against each other. They then move as a unit into an enlarged section of one of the halves when the coupling is further pressed together, whereby a continuous fluid conduit is formed past the plugs.

An additional feature resides in the provision of a pair of plugs as described above, having opposed surfaces which abut each other so as to exclude substantially all material from between them.

An optional feature resides in a unique ball type lock which permits the coupling to be easily parted.

These and other features of the invention will be fully understood from the following detailed description and the accompanying drawings, of which:

Figure 3:
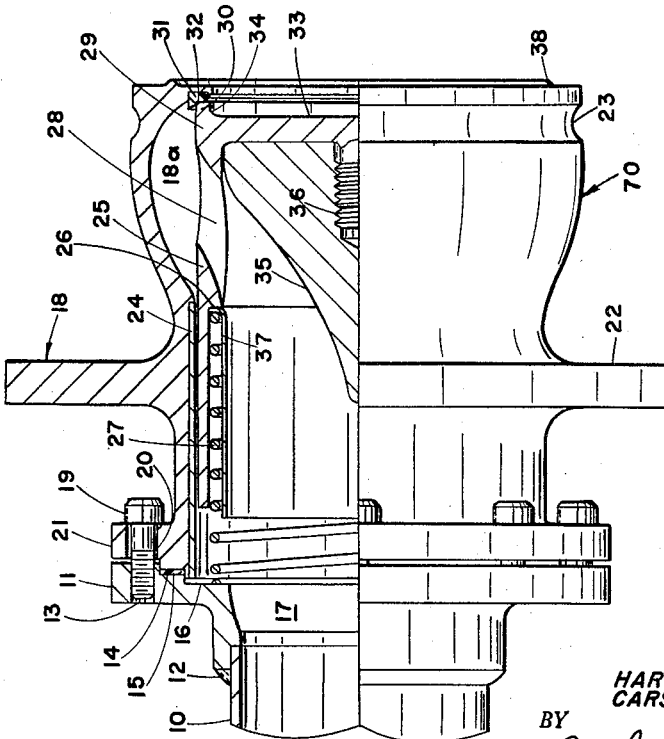
Fig. 3 is an elevation of one mating half of the coupling in its disconnected condition, shown partly in cross-section.

Fluid flow therethrough is from left to right in all views. In the description to follow, items facing to the left may be referred to as upstream components, and those facing right as downstream components. Referring now to the drawings, Fig. 3 illustrates the inlet half of the coupling in its disconnected condition. Fluid enters through a supply conduit 10 made of a material which is inert with respect to the material to be handled, and which may be metallic, this conduit being attached to a supply conduit flange member 11 by means such as welding 12. This flange member 11 has threaded holes 13, a seat 14 to receive an annular gasket 15, and a shoulder 16, all outside of its central passage 17.

An inlet housing 18 is attached to flange member 11 by bolts 19 threaded into holes 13 through passages 20 in a flange 21 on the inlet housing, thus rigidly fixing the housing to the supply conduit. The inlet housing 18 is generally circular in cross-section with a circumferential flange 22 for a handle, and a curved circumferential locking groove 23 on its outside near the downstream end of the inlet housing. Toward its downstream end, its cross-section enlarges to form an expanded inner chamber or cross-section 18a. The cross-section then is reduced again in size at the downstream end. A cylindrical insert 24 is fitted within the inlet housing near the supply conduit flange member, and an inlet sliding member 25 fits next to insert 24 in axially slidable relationship.

The inlet sliding member 25 is generally cylindrical at its upstream end, and has an inwardly directed shoulder 26 against which an inlet spring 27 bears. The spring is opposed at its upstream end by the shoulder 16 on the supply conduit flange member. Downstream of the shoulder, the inlet sliding member is reduced to three streamlined connecting links 28. That is to say, most of the sliding member is cut away so as to provide a fluid conduit past it. Beyond these passages, a solid circular disc or central plug 29 is attached to the links. This plug forms a closure member for the inlet member in the disconnected condition. A raised annular boss 30 on the inlet sliding member 25 is directly opposed to a resilient sealing gasket 31 in a seat 32 on the inner upstream side of the inlet housing member. The downstream surface 33 of the disc is generally flat inside the boss 30, except that the transition 34 from boss 30 to surface 33 is curved for a purpose later to be described.

Inside the inlet housing, and on the upstream side of the plug, an inlet fairing 35 having a compound curved surface of revolution is threaded to the inlet sliding member 25 by threads 36 so as to provide a smooth flow of fluid thereby when the inlet passage is open, with a minimum pressure loss. A cylindrical sleeve 37 is attached to shoulder 26 on the sliding member 25 to avoid the turbulence which might be caused by fluid flowing through the spring coils. The inlet housing has an additional raised sealing ring 38 on its downstream side.

Figure 4:
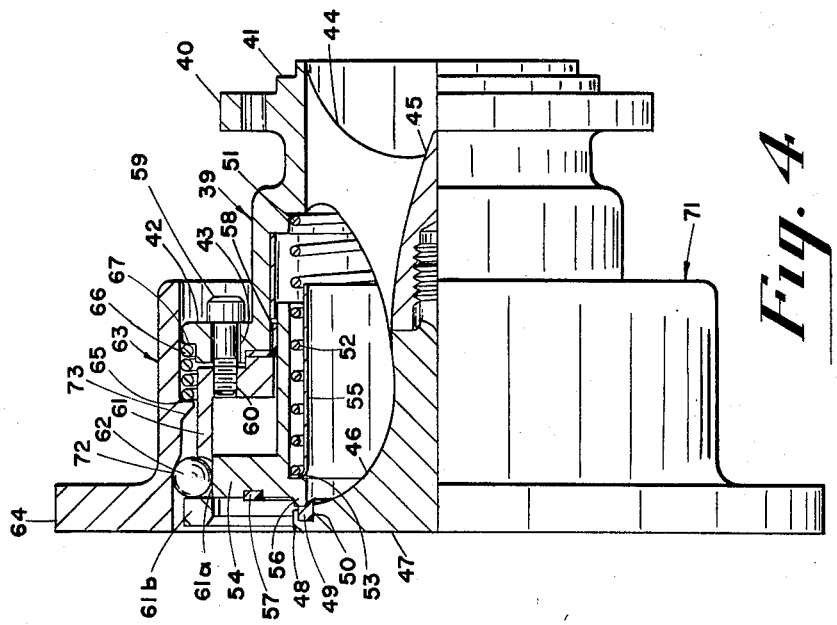
Fig. 4 is an elevation of the other mating half of the coupling in its disconnected condition, shown partly in cross-section.

Fig. 4 shows the mating part of the coupling. This is preferably mounted to the receptacle, and seals it when the coupling is disconnected. It will be referred to as the outlet half. This half comprises an outlet housing 39 with a flange 40 for attachment to a receptacle (not shown) and an outer shoulder 41 for gaskets. At its outer upstream end, a circumferential flange 42 has passages 43 therein by means of which a locking mechanism may be attached to the housing. The outer part of the outlet housing is integral and fluid tight, but at the downstream end, the housing is reduced to three streamlined links 44 which suspend a central segment 45 in the center of the housing. This segment has smooth curved surfaces for ease of fluid flow, and passages are thus formed inside the housing.

An outlet fairing or central plug 46 having a generally circular compound curved surface of revolution for streamlining flow is threaded onto segment 45, thus becoming, in effect, a part of the outlet housing. This fairing 46 has a generally flat upstream plugging face 47 with a circumferential edge to match the downstream surface 33 of plug 29. A gasket 49 is held in an annular seat 50 on the downstream side of the fairing near its upstream end.

A shoulder 51 inside the housing opposes one end of a spring 52, which is opposed at its other end by a shoulder 53 on an outlet sliding member or enclosure member 54. A cylindrical sleeve 55 covers the inside of the spring to diminish turbulence of flow which might result from fluid contact with the spring coils. The outlet sliding member has a boss 56 on its upstream face oposite gasket 49, and a gasket 57 on the same side opposite boss 38.

A flanged annular gasket 58 fits around the sliding member and its flange rests on flange 42 of the outlet housing so as to seal against fluid flow thereby. Bolt 59 passes through hole 43, and enters a threaded hole 60 in an annular locking ring 61. This locking ring has a plurality of seats 61a arranged circumferentially in which metal balls 62 are placed. A ring 61b is disposed substantially in line with the locking ring to restrain the balls in the seat. The balls may move slightly in a radial direction in these seats when the surrounding members permit it. A release member 63 surrounds the locking ring 61, having an exterior handling flange 64, and interior shoulder 65. A locking spring 66 is opposed by shoulder 65 on the release member and shoulder 67 on the flange 42 of the outlet housing. The interior surface of the release member has two sloped shoulders 72, 73 at different radial distances from the axis of the coupling.

The operation of the coupler will now be described. Fig. 3 shows the inlet member 70 in its disconnected condition, so that the supply line is tightly closed off. Assuming for a moment that supply pressure is either low or off, the sealing of the inlet half will then depend on the spring 27, which shoves the inlet sliding member 25 and plug axially downstream so that boss 30 presses firmly against gasket 31 at the smaller downstream outlet, thus preventing fluid leakage out of the coupling half. In the event that pressure is on the line, the sealing force will be greater because of the fluid force on the sliding member. Should a relatively negative pressure exist within the supply line, the spring will prevent backflow at least until the back differential pressure causes a force which counterbalances that of the spring. The spring will be chosen to resist any anticipated back pressures.

Fig. 4 shows the outlet coupling member 71 in its disconnected condition. Here the outlet sliding member 54 is pressed axially upstream by spring 52 so that boss 56 is firmly forced against gasket 49, thus sealing off the inside of the outlet member. Since this half is usually firmly attached to a receptacle under pressure, the sealing action is even more positive, due to the augmented force on the sliding member 54. Flanged gasket 58 prevents leakage of fluid past the locking means. The locking means are shown in Fig. 4 in the disconnected condition. The re-release member 63 is shown compressing spring 66, this being the position to release the coupling. This position represents its greatest downstream displacement. The spring 66 is fully compressed between shoulders 65 and 67, and the ball 62 rests against a comparatively high, curved shoulder 72 of the inner surface of the release member 63. The ball is thus rigidly held in the seat 61a in the annular locking ring 61, and bears against the sliding member 54 and the shoulder 72. The spring tends to force the release member upstream, but such movement cannot occur, since the shoulder 72 prevents such movement so long as the ball remains at the level shown. This single ball is used as an example, it being understood that a plurality of balls may be disposed around the circumference of the members if desired.

Figure 1:
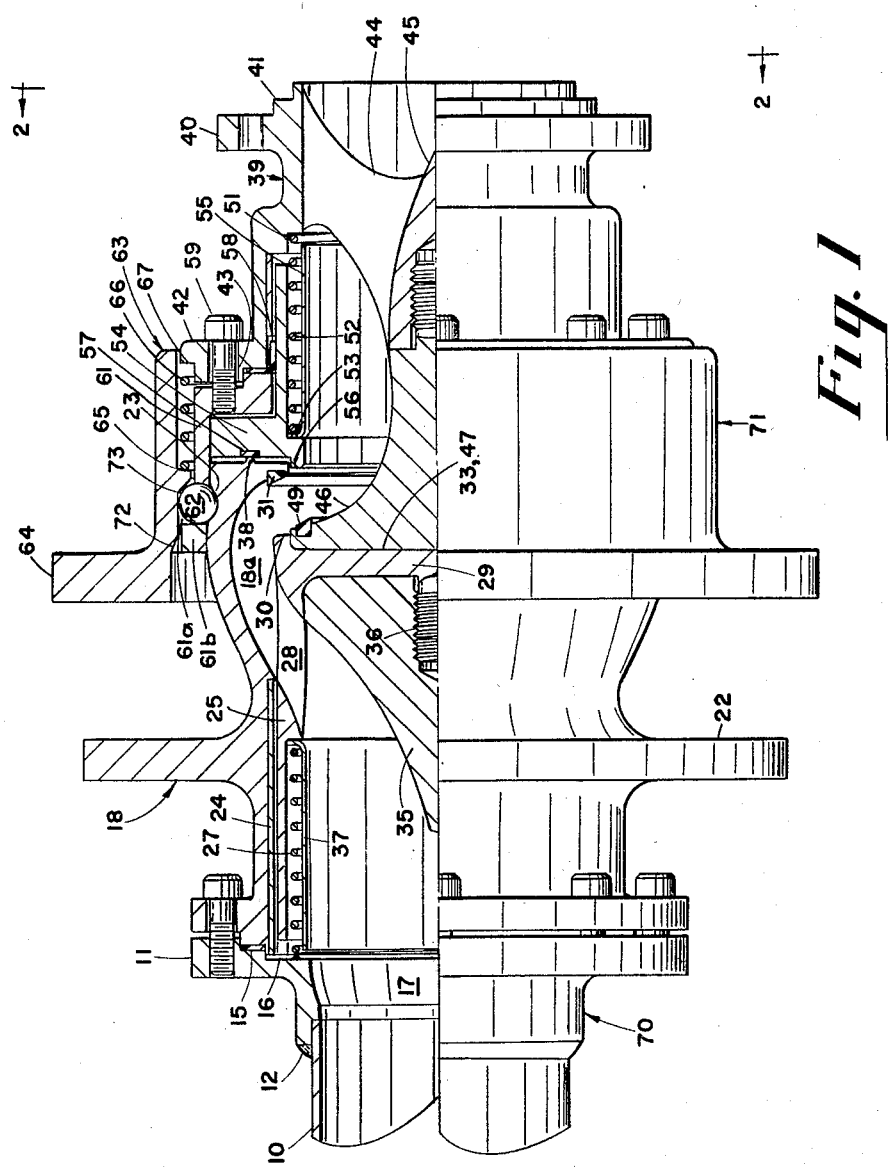
Fig. 1 is an elevation of an assembled coupling according to the invention, shown partly in cross-section taken along line 1—1 of Fig. 2.
Figure 2:
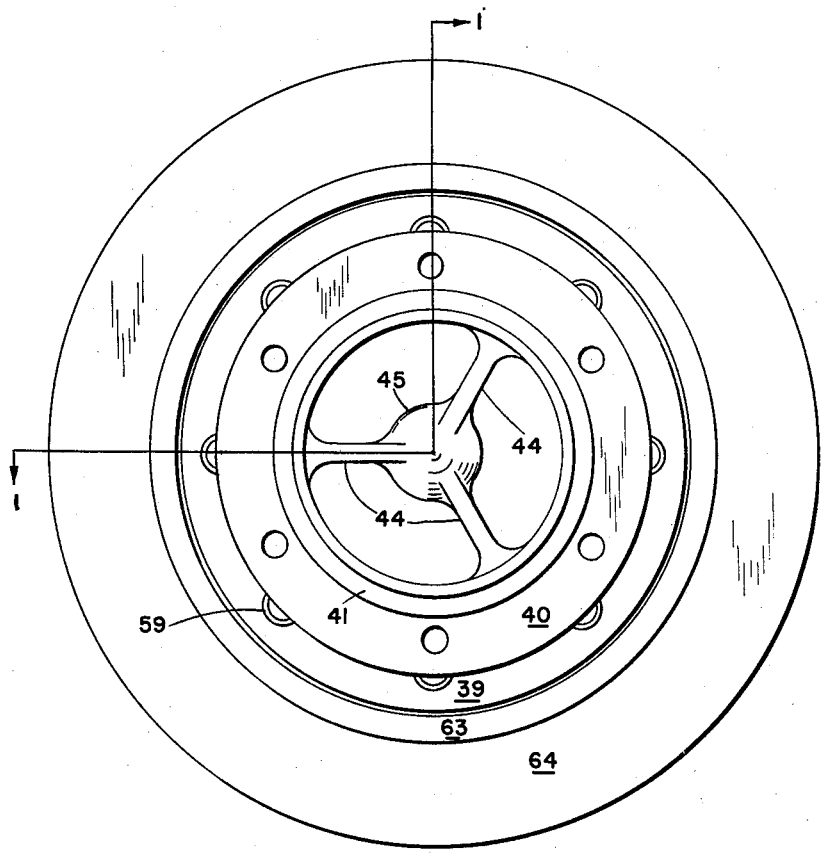
Fig. 2 is an end view taken along line 2—2 of Fig. 1.

Fig. 1 shows the coupling halves mated to form one continuous and open fluid conduit. The inlet housing 18 has been inserted inside the release member 63, whereby boss 38 presses against gasket 57 to form a fluid-tight barrier. At the same time, the upstream face 47 of the outlet fairing has been seated on the downstream surface 33 of the disc in the inlet member. Thus the two members abut. The surfaces are similar in configuration, in this case, substantially planar and circular. In addition, face 47 fits within the curved transition 34 of surface 33, aiding in matching the halves on assembly. Since the surfaces are such an intimate fit, fluids will not accumulate between them in significant quantities, and when the halves are disconnected, fluids will not remain outside of the then sealed halves and their conduits. In addition, foreign matter between them when initially joined will largely be retained there, lessening the danger of system contamination.

Further pushing causes the inlet sliding member 25 to be shoved upstream, and the outlet sliding member 54 to be moved relatively downstream, thus opening a fluid conduit outside the fairings and inside the sliding members and housings. This, in effect, moves the abutment of the plugs upstream into the expanded chamber 18a, where the expanded cross-section of 18a causes the face 47 and surface 33 to be separated from their respective sealing gaskets 31 and 49, permitting flow through the joined halves.

As this further coupling action was accomplished, the upstream end of the inlet housing slid downstream beneath the balls, and pressed member 54 downstream also. This did not change the situation of the locking means, since the balls could not yet move toward the axis of the coupling, the sliding member 54 being in the way. However, when the couplings were pushed completely together, the circumferential groove 23 moved under balls 62, and the balls are forced into it by surface 72, which is forced upstream by spring 66, which also causes the release member to move axially upstream until the other shoulder 73 bears against the ball. In this condition, which is shown in Fig. 1, the balls are restrained by shoulder 73, seat 61a, and groove 23, and the two halves are locked together. The spring 66 holds the release member at its upstream position.

When the coupling is to be released, the operator need only push on the handling flange 64 to move the release member in a downstream direction so that the larger shoulder 72 is again over the balls. This permits the balls to rise from the circumferential groove, and frees the coupling halves for relative axial motion. As shown in Fig. 4, the release member remains in that downstream position because of restraint by shoulder 72, seat 61a, and sliding member 54.

As the halves are separated, the inlet housing remains in contact with the outlet sliding member until the plugs of each half again seal the open ends. Thus there is no residual fluid outside the seals to spill on disconnecting, and any foreign material which might have been on the face of the plugs will remain there, and not enter the system. It will be noted that there is only one sliding seal in the entire assembly, at annular gasket 58. All other seals are static and have no relative motion. Thus there is a minimum of wear on the sealing parts.

The connection is simple and quick as well as positive. It requires a bare minimum of manipulation by the operator. Operator effort may be reduced still more by providing booster devices for the lock mechanism, whereby air pressure or fluid pressure could be exerted to move the release ring, or toggles and dogs might be used to hold the two halves after their union. It will be further noted that in case of an accidental disconnect, all conduits are plugged, and pressure remaining in the line simply makes a tighter seal.

It will be recognized that various changes or modifications may be made from the precise arrangements shown in the drawings without departing from the scope of the invention. For example, other locking arrangements than the ball type arangement involving balls 62 could, of course, be used. Such other equivalent types of locking arrangements may readily suggest themselves to those skilled in the art without departing from the invention.

Our invention is not to be limited to the embodiments shown in the drawings and described in the description, which are given by way of description and not limitation, but only by the scope of the appended claims.

We claim:

1. A coupling comprising a first and a second mating part adapted to be coaxially aligned and coupled with each other, the first part comprising a hollow outer housing having an exterior recess and having an inlet at one end and an outlet at the other end with an interior chamber between the inlet and outlet, the cross-section of said outlet being smaller than the cross-section of the region within said housing just upstream from the outlet, a plug member located within the chamber movable back and forth in the direction of the axis of the chamber, spring-loading means applied between the housing and the plug member urging the plug member to slide in the downstream direction into sealing engagement with said outlet, said second part comprising an enclosure member having a hollow interior provided with an inlet and an outlet, a plug means having an arm and having a sealing member located within said hollow interior, spring-loading means applied between said plug means and said enclosure member urging the sealing member of said plug means into sealing engagement with the inlet of said enclosure member, sealing means at the inlet end of said enclosure member adapted to seal with the outlet end of said housing when said first and second parts are brought into coaxial abutment with each other, sealing means on said plug member and said plug means for sealing engagement between them when the first and second parts are brought into coaxial abutment, and locking means for holding the two parts in coupled coaxial abutment, said locking means comprising a release member surrounding the enclosure member and having an interior wall provided with a first shoulder and a second shoulder, spring-loading means acting between the release member and the plug means urging them to move in opposite axial directions, and a ball means held in the arm of said plug means and making contact with the inner surface of said release member, whereby when the two parts are brought together in coaxial abutment, the plug member and the plug means seal together and the housing and the enclosure seal together, and movement of said release member toward said first part urges the ball means to move over said housing and into the recess thereof and to move the enclosure in the downstream direction relative to the plug means and into unsealing relation with the plug means and also to move the plug member upstream relative to the housing into unsealing relation with the housing, the movement of the enclosure enabling the ball means to drop in the recess and to engage against the second shoulder to constitute a locked situation, under which condition there is permitted free flow of fluid between the first and second parts.

2. Apparatus according to claim 1 in which the recess is a circumferential groove, the release member is a ring surrounding the enclosure member, the shoulders are annular, and the ball means comprises a plurality of balls.

3. Apparatus according to claim 1 in which the abutting surfaces of the plug member and plug means have matching substantially planar surfaces and are so arranged that fluids are substantially excluded from between the surfaces when the plug member and plug means abut each other.

4. In a coupling having two mating parts, each having an exterior surface: means for locking the parts together comprising an outer recess on the exterior surface of a first of the parts, a release member adjacent the exterior surface of the second of the parts and longitudinally movable relative to said second part, said release member having an internal surface facing said second part with a first shoulder and a second shoulder on said internal surface, a sleeve-carrying member having a sleeve slidable in a position between the release member and the second part, said sleeve having an opening through it, a ball in said opening adapted to be seated within the recess and against said first shoulder in the position of locking of said parts together, and adapted to be seated between said second shoulder and the exterior surface of said second part in an unlocked position of said parts, and spring-loading means operative between the release member and said sleeve member urging said sleeve to move said ball in the direction from said second shoulder towards said first shoulder, whereby said parts are held together by the ball in the locked position, and shifting of the release member to move said second shoulder against said ball unlocks said parts from each other.

5. Apparatus according to claim 4 in which the recess is a circumferential groove, the release member is a ring surrounding the second half and the shoulders are annular.

References Cited in the file of this patent

UNITED STATES PATENTS

| | | |
|---|---|---|
| 2,309,890 | Fisher | Feb. 2, 1943 |
| 2,416,967 | Thomas | Mar. 4, 1947 |
| 2,428,637 | Scheiwer | Oct. 7, 1947 |
| 2,441,363 | Krueger | May 11, 1948 |
| 2,448,933 | Thomas | Sept. 7, 1948 |
| 2,503,495 | Koester | Apr. 11, 1950 |
| 2,648,548 | Schiewer | Aug. 11, 1955 |
| 2,648,553 | Ulrich | Aug. 11, 1955 |
| 2,705,159 | Pfau | Mar. 29, 1955 |
| 2,739,827 | Krone et al. | Mar. 27, 1956 |